June 20, 1933.     C. S. BROWN     1,915,118
ROLLER BEARING CONSTRUCTION
Filed April 23, 1930
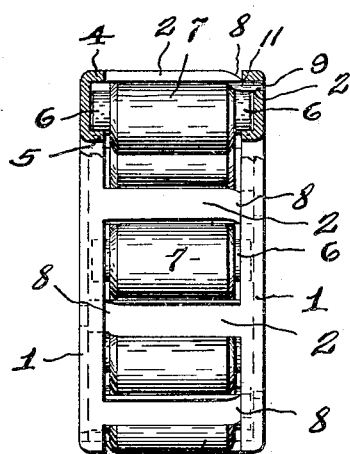
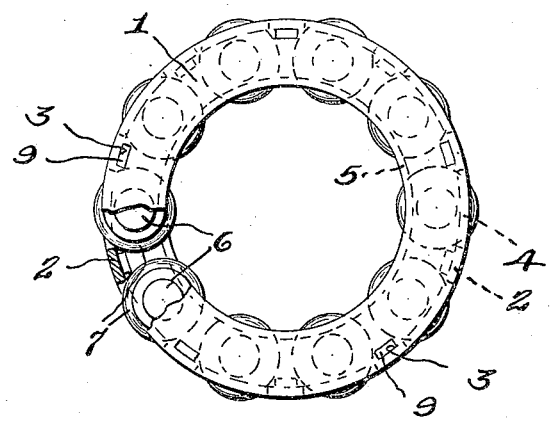
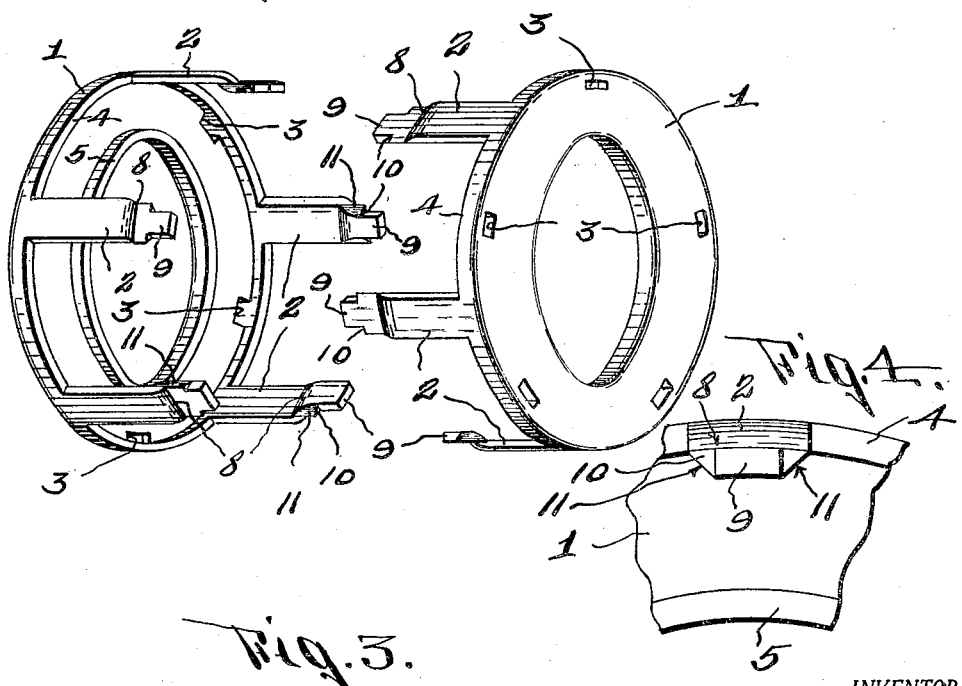
INVENTOR.
Charles S. Brown
BY Bodell & Thompson
ATTORNEYS.

Patented June 20, 1933

1,915,118

UNITED STATES PATENT OFFICE

CHARLES S. BROWN, OF SYRACUSE, NEW YORK

ROLLER BEARING CONSTRUCTION

Application filed April 23, 1930. Serial No. 446,672.

This invention relates to roller bearings and has for its object a particularly simple, efficient and light cage for holding the rollers, which cage is simple and economical in construction and consists of but two parts, which are preferably duplicate and which parts can be readily formed up from sheet metal.

The invention consists in the novel features and in the combinations and constructions hereinafter set forth and claimed.

In describing this invention reference is had to the accompanying drawing in which like characters designate corresponding parts in all the views.

Figure 1 is a side elevation of this roller bearing partly broken away.

Figure 2 is an edge view thereof, partly broken away.

Figure 3 is a perspective view of the sections of the cage, the sections being shown as separated.

Figure 4 is an enlarged fragmentary view of the cage illustrating the clearances at the end of each roller spacing tongue.

The cage comprises two sections, which are usually duplicate, each section including a head 1 formed with a raceway for receiving the ends of the rollers, tongues 2 projecting from the outer edge of the head toward the other head and openings 3 between the tongues for receiving the ends of the tongues of the other head. Each head is provided with inwardly projecting peripheral and inner flanges 4, 5 which form raceways for receiving the axles 6 of the rollers 7. The tongues 2 project from the outer flange 4 and the openings 3 are located in the bottom of the raceway within the circle of the outer flange 4 and near said flange 4.

Each tongue has its outer or free end deflected inwardly at 8 so as to bring the end thereof into alinement with the opening 3 of the other head. The end of each tongue is provided with a reduced portion 9 for entering the adjacent opening 3 and with a shoulder 10 at the base of the reduced portion for abutting against the inner face of the adjacent head.

When the two sections are assembled, they are held together by clinching the projections, welding or riveting them.

The rollers 7 are arranged with their axles 6 in the raceways and projecting between the spacing strips or tongues 2, and the inwardly deflected ends 8 are bevelled at 11 to provide clearances for the ends of the rollers.

The cage is formed up by any suitable forming process either stamping or drawing or both and the sections are preferably duplicates. The rollers are placed in one section and the other section assembled and the ends of the projections 9 secured in the openings 3.

This bearing is particularly advantageous in that in addition to the rollers, it consists of but two parts which are duplicates and readily assembled and owing to the deflected ends, the heads are of minimum diameter for a bearing of given diameter and no additional stock above a given diameter need be taken into consideration for supporting tie-rods or pieces and the like. The tongues which serve as tie-pieces are also located so as to provide spacers, all arranged within a minimum diameter for a given size bearing.

What I claim is:

1. A roller bearing comprising a cage consisting of opposing duplicate sections, each section consisting of an annular head formed with a raceway on its inner face and integral tongues projecting from the outer edge of the head outside of the raceway toward the other head and openings between the tongues, the tongues of one head alternating with those of the other and extending into the openings of the other head, said tongues forming roller receiving slots and the tongues serving as roller spacers and rollers projecting through the slots and having their ends in said raceways.

2. A roller bearing comprising a cage consisting of opposing duplicate sections, each section consisting of an annular head formed with a raceway on its inner face and integral tongues projecting from the outer margin of the head outside of the raceway toward the other head and openings in the bottom of the raceway between the tongues, the tongues of one head alternating with those of the other and extending into the openings of the other head, said tongues being flat and arranged with their inner and outer faces in a cylindrical curve and forming roller receiving slots and the tongues serving as roller spacers, rollers projecting through the slots and having their ends in said raceways, the outer ends of the tongues being deflected inwardly into alinement with the openings of the adjacent head, the deflected portions coacting with the adjacent ends of the rollers.

3. A roller bearing comprising a cage consisting of opposing duplicate sections, each section consisting of an annular head formed with a raceway on its inner face and integral tongues projecting from the outer edge of the head outside of the raceway toward the other head and openings in the bottom of the raceway between the tongues, the tongues of one head alternating with those of the other and extending into the openings of the other head, said tongues forming roller receiving slots and the tongues serving as roller spacers, rollers projecting through the slots and having their ends in said raceways, the outer ends of the tongues being deflected inwardly into alinement with the openings of the adjacent head, the inwardly deflected end portions of the tongues being bevelled at their opposite edges to form clearances for the rollers.

In testimony whereof, I have hereunto signed my name at Syracuse, in the county of Onondaga, and State of New York, this 21st day of April, 1930.

CHARLES S. BROWN.